United States Patent
Aidasani et al.

(10) Patent No.: US 9,916,582 B2
(45) Date of Patent: Mar. 13, 2018

(54) SYSTEMS AND METHODS FOR GENERATING AND USING A DIGITAL PASS

(71) Applicant: III Holdings 1, LLC, Wilmington, DE (US)

(72) Inventors: Dilip Aidasani, Brooklyn, NY (US); Kimberly Alderfer, Hoboken, NJ (US); Kate T. King, Seaford (GB); Anup Anil Parekh, Woodindean (GB); Abbas-Ali Hassan Rajwani, Worthing (GB); Stuart Rolinson, Cave Creek, AZ (US)

(73) Assignee: III Holdings 1, LLC, Wilmington, DE (US)

( * ) Notice: Subject to any disclaimer, the term of this patent is extended or adjusted under 35 U.S.C. 154(b) by 0 days.

(21) Appl. No.: 14/605,623

(22) Filed: Jan. 26, 2015

(65) Prior Publication Data

US 2015/0142570 A1    May 21, 2015

Related U.S. Application Data

(63) Continuation of application No. 13/193,282, filed on Jul. 28, 2011, now abandoned.

(51) Int. Cl.
  *G06Q 20/40* (2012.01)
  *G06Q 30/06* (2012.01)
  *G07B 15/02* (2011.01)

(52) U.S. Cl.
  CPC ......... *G06Q 20/40* (2013.01); *G06Q 30/0609* (2013.01); *G07B 15/02* (2013.01)

(58) Field of Classification Search
  CPC ....................................................... G06Q 20/40
  See application file for complete search history.

(56) References Cited

U.S. PATENT DOCUMENTS

| | | |
|---|---|---|
| 4,817,080 A | 3/1989 | Soha |
| 4,984,155 A | 1/1991 | Geier et al. |
| 4,992,940 A | 2/1991 | Dworkin |
| 4,999,806 A | 3/1991 | Chernow et al. |
| 4,999,833 A | 3/1991 | Lee |

(Continued)

FOREIGN PATENT DOCUMENTS

| | | |
|---|---|---|
| EP | 0372716 | 6/1990 |
| EP | 0749081 | 12/1996 |

(Continued)

OTHER PUBLICATIONS

"Wholesale Account Application" at http://www.allstates-flag.com/forms/wholesale_app.pdf; AliStates Flag Co., Inc.; Missouri Corporation, 2 pages.

(Continued)

*Primary Examiner* — Jacob C Coppola
(74) *Attorney, Agent, or Firm* — Meyertons, Hood, Kivlin, Kowert & Goetzel, P.C.

(57) ABSTRACT

A system, method, and article of manufacture for generating a digital pass is disclosed. The method may comprise retrieving a plurality of identity attributes, and grouping a subset of identity attributes in the plurality of identity attributes to generate at least one digital pass. The method may further comprise grouping a subset of static identity attributes and a subset of dynamic identity attributes to generate a digital pass.

12 Claims, 6 Drawing Sheets

(56) References Cited

U.S. PATENT DOCUMENTS

| | | |
|---|---|---|
| 5,131,039 A | 7/1992 | Chaum |
| 5,202,921 A | 4/1993 | Herzberg et al. |
| 5,239,617 A | 8/1993 | Gardner et al. |
| 5,283,731 A | 2/1994 | Lalonde et al. |
| 5,299,115 A | 3/1994 | Fields et al. |
| 5,299,125 A | 3/1994 | Baker et al. |
| 5,317,677 A | 5/1994 | Dolan et al. |
| 5,319,542 A | 6/1994 | King, Jr. et al. |
| 5,321,620 A | 6/1994 | Tanaka et al. |
| 5,347,632 A | 9/1994 | Filepp et al. |
| 5,355,327 A | 10/1994 | Stent et al. |
| 5,369,577 A | 11/1994 | Kadashevich et al. |
| 5,379,420 A | 1/1995 | Ullner |
| 5,390,281 A | 2/1995 | Luciw et al. |
| 5,414,838 A | 5/1995 | Kolton et al. |
| 5,434,777 A | 7/1995 | Luciw |
| 5,440,634 A | 8/1995 | Jones et al. |
| 5,444,823 A | 8/1995 | Nguyen |
| 5,465,206 A | 11/1995 | Hilt et al. |
| 5,473,732 A | 12/1995 | Chang |
| 5,557,518 A | 9/1996 | Rosen |
| 5,557,721 A | 9/1996 | Fite et al. |
| 5,602,918 A | 2/1997 | Chen et al. |
| 5,603,031 A | 2/1997 | White et al. |
| 5,621,797 A | 4/1997 | Rosen |
| 5,636,346 A | 6/1997 | Saxe |
| 5,642,279 A | 6/1997 | Bloomberg et al. |
| 5,644,724 A | 7/1997 | Cretzler |
| 5,650,768 A | 7/1997 | Eswaran |
| 5,664,115 A | 9/1997 | Fraser |
| 5,668,953 A | 9/1997 | Sloo |
| 5,671,279 A | 9/1997 | Elgamal |
| 5,671,280 A | 9/1997 | Rosen |
| 5,696,965 A | 12/1997 | Dedrick |
| 5,701,451 A | 12/1997 | Rogers et al. |
| 5,704,046 A | 12/1997 | Hogan |
| 5,706,507 A | 1/1998 | Schloss |
| 5,715,399 A | 2/1998 | Bezos |
| 5,717,866 A | 2/1998 | Naftzger |
| 5,717,923 A | 2/1998 | Dedrick |
| 5,721,827 A | 2/1998 | Logan et al. |
| 5,721,831 A | 2/1998 | Waits et al. |
| 5,721,832 A | 2/1998 | Westrope et al. |
| 5,724,424 A | 3/1998 | Gifford |
| 5,724,521 A | 3/1998 | Dedrick |
| 5,727,163 A | 3/1998 | Bezos |
| 5,732,400 A | 3/1998 | Mandler et al. |
| 5,740,549 A | 4/1998 | Reilly et al. |
| 5,745,882 A | 4/1998 | Bixler et al. |
| 5,745,886 A | 4/1998 | Rosen |
| 5,752,238 A | 5/1998 | Dedrick |
| 5,754,938 A | 5/1998 | Herz et al. |
| 5,757,917 A | 5/1998 | Rose et al. |
| 5,758,327 A | 5/1998 | Gardner et al. |
| 5,787,403 A | 7/1998 | Randle |
| 5,790,677 A | 8/1998 | Fox et al. |
| 5,794,210 A | 8/1998 | Goldhaber et al. |
| 5,799,284 A | 8/1998 | Bourquin |
| 5,809,317 A | 9/1998 | Kogan et al. |
| 5,812,134 A | 9/1998 | Pooser et al. |
| 5,812,135 A | 9/1998 | Kotchey |
| 5,815,657 A | 9/1998 | Williams et al. |
| 5,822,737 A | 10/1998 | Ogram |
| 5,826,241 A | 10/1998 | Stein |
| 5,838,790 A | 11/1998 | McAuliffe et al. |
| 5,839,119 A | 11/1998 | Krsul et al. |
| 5,845,260 A | 12/1998 | Nakano et al. |
| 5,870,723 A | 2/1999 | Pare, Jr. et al. |
| 5,878,139 A | 3/1999 | Rosen |
| 5,878,141 A | 3/1999 | Daly et al. |
| 5,883,810 A | 3/1999 | Franklin et al. |
| 5,884,272 A | 3/1999 | Walker et al. |
| 5,886,634 A | 3/1999 | Muhme |
| 5,890,137 A | 3/1999 | Koreeda |
| 5,897,621 A | 4/1999 | Boesch et al. |
| 5,918,014 A | 6/1999 | Robinson |
| 5,918,213 A | 6/1999 | Bernard et al. |
| 5,924,084 A | 7/1999 | De Rooij |
| 5,937,163 A | 8/1999 | Lee et al. |
| 5,937,390 A | 8/1999 | Hyodo |
| 5,940,811 A | 8/1999 | Norris |
| 5,948,061 A | 9/1999 | Merriman et al. |
| 5,949,044 A | 9/1999 | Walker et al. |
| 5,952,638 A | 9/1999 | Demers et al. |
| 5,956,699 A | 9/1999 | Wong et al. |
| 5,960,411 A | 9/1999 | Hartman et al. |
| 5,961,593 A | 10/1999 | Gabber et al. |
| 5,963,134 A | 10/1999 | Bowers et al. |
| 5,963,908 A | 10/1999 | Chadha |
| 5,963,925 A | 10/1999 | Kolling et al. |
| 5,970,475 A | 10/1999 | Barnes et al. |
| 5,987,140 A | 11/1999 | Rowney et al. |
| 5,991,750 A | 11/1999 | Watson |
| 5,996,076 A | 11/1999 | Rowney et al. |
| 5,999,596 A | 12/1999 | Walker et al. |
| 6,000,832 A | 12/1999 | Franklin et al. |
| 6,002,767 A | 12/1999 | Kramer |
| 6,006,200 A | 12/1999 | Boies et al. |
| 6,014,634 A | 1/2000 | Scroggie et al. |
| 6,016,504 A | 1/2000 | Arnold et al. |
| 6,029,195 A | 2/2000 | Herz |
| 6,029,890 A | 2/2000 | Austin |
| 6,035,280 A | 3/2000 | Christensen |
| 6,049,785 A | 4/2000 | Gifford |
| 6,119,096 A | 9/2000 | Mann et al. |
| 6,119,101 A | 9/2000 | Peckover |
| 6,149,055 A | 11/2000 | Gatto |
| 6,169,974 B1 | 1/2001 | Baumgartner et al. |
| 6,173,269 B1 * | 1/2001 | Solokl ............... G07F 19/201 705/35 |
| 6,175,922 B1 | 1/2001 | Wang |
| 6,178,407 B1 | 1/2001 | Lotvin et al. |
| 6,182,052 B1 | 1/2001 | Fulton et al. |
| 6,182,894 B1 | 2/2001 | Hackett et al. |
| 6,193,155 B1 | 2/2001 | Walker et al. |
| 6,232,877 B1 | 5/2001 | Ashwin |
| 6,267,292 B1 | 7/2001 | Walker et al. |
| 6,278,935 B1 | 8/2001 | Kaplan et al. |
| 6,286,002 B1 | 9/2001 | Axaopoulos et al. |
| 6,292,786 B1 | 9/2001 | Deaton et al. |
| 6,298,330 B1 | 10/2001 | Gardenswartz et al. |
| 6,298,348 B1 | 10/2001 | Eldering |
| 6,321,339 B1 | 11/2001 | French et al. |
| 6,327,574 B1 | 12/2001 | Kramer et al. |
| 6,332,134 B1 | 12/2001 | Foster |
| 6,343,279 B1 | 1/2002 | Bissonette et al. |
| 6,366,933 B1 | 4/2002 | Ball et al. |
| 6,456,984 B1 | 9/2002 | Demoff et al. |
| 6,477,513 B1 | 11/2002 | Walker et al. |
| 6,577,238 B1 | 6/2003 | Whitesmith et al. |
| 6,587,835 B1 | 7/2003 | Treyz et al. |
| 6,609,658 B1 | 8/2003 | Sehr |
| 6,636,833 B1 | 10/2003 | Flitcroft et al. |
| 6,658,393 B1 | 12/2003 | Basch et al. |
| 6,675,153 B1 | 1/2004 | Cook et al. |
| 6,708,086 B2 | 3/2004 | Richard |
| 6,738,978 B1 | 5/2004 | Hendricks et al. |
| 6,807,530 B1 | 10/2004 | Shub et al. |
| 6,812,824 B1 | 11/2004 | Goldinger et al. |
| 6,883,710 B2 | 4/2005 | Chung |
| 6,892,307 B1 | 5/2005 | Wood et al. |
| 6,996,535 B1 | 2/2006 | Ono et al. |
| 7,035,816 B2 | 4/2006 | Jankelewitz |
| 7,065,494 B1 | 6/2006 | Evans |
| 7,082,412 B1 | 7/2006 | Treider et al. |
| 7,104,443 B1 | 9/2006 | Paul et al. |
| 7,104,446 B2 | 9/2006 | Bortolin et al. |
| 7,127,427 B1 | 10/2006 | Casper |
| 7,136,853 B1 | 11/2006 | Kohda et al. |
| 7,146,342 B1 | 12/2006 | Angelin et al. |
| 7,194,437 B1 | 3/2007 | Britto et al. |
| 7,214,891 B1 | 5/2007 | Hewitt et al. |
| 7,216,292 B1 * | 5/2007 | Snapper ............... G06F 17/243 715/234 |

(56) References Cited

U.S. PATENT DOCUMENTS

| | | |
|---|---|---|
| 7,225,142 B1 | 5/2007 | Apte et al. |
| 7,302,429 B1 | 11/2007 | Wanker |
| 7,320,001 B1 | 1/2008 | Chen |
| 7,330,846 B1 | 2/2008 | Dirisala et al. |
| 7,333,056 B2 | 2/2008 | Kishigami et al. |
| 7,333,953 B1 | 2/2008 | Banaugh et al. |
| 7,386,476 B1 | 6/2008 | Shavanadan et al. |
| 7,407,095 B1 | 8/2008 | Liu et al. |
| 7,487,361 B2* | 2/2009 | Birk ............ G06F 21/31 726/2 |
| 7,509,289 B2 | 3/2009 | Barron et al. |
| 7,533,809 B1 | 5/2009 | Robinson et al. |
| 7,539,500 B2 | 5/2009 | Chiang |
| 7,539,742 B2 | 5/2009 | Spector |
| 7,640,187 B1 | 12/2009 | Sonderegger et al. |
| 7,725,492 B2 | 5/2010 | Sittig et al. |
| 7,747,475 B1 | 6/2010 | Bowman et al. |
| 7,774,229 B1 | 8/2010 | Dernehl et al. |
| 7,822,635 B1 | 10/2010 | Brown et al. |
| 7,835,753 B2 | 11/2010 | Alfert et al. |
| 7,849,020 B2 | 12/2010 | Johnson |
| 7,865,943 B2 | 1/2011 | Hayler et al. |
| 7,984,484 B1* | 7/2011 | Rakowski ............ H04L 51/00 726/3 |
| 8,055,551 B2 | 11/2011 | Milgramm et al. |
| 8,140,402 B1 | 3/2012 | Mesaros |
| 8,166,406 B1 | 4/2012 | Goldfeder et al. |
| 8,170,580 B2 | 5/2012 | Dingler et al. |
| 8,200,529 B2 | 6/2012 | Hamilton, II et al. |
| 8,260,716 B2 | 9/2012 | Hoffman et al. |
| 8,289,135 B2 | 10/2012 | Griffin |
| 8,407,144 B2 | 3/2013 | Roberts et al. |
| 8,489,452 B1 | 7/2013 | Warner et al. |
| 8,587,454 B1 | 11/2013 | Dearworth |
| 8,666,801 B2 | 3/2014 | Cho |
| 8,781,958 B2 | 7/2014 | Michael |
| 8,793,757 B2 | 7/2014 | Ahn |
| 8,799,984 B2 | 8/2014 | Ahn |
| 8,825,517 B2 | 9/2014 | Hammad et al. |
| 2001/0011250 A1 | 8/2001 | Paltenghe et al. |
| 2001/0016755 A1 | 8/2001 | Addis |
| 2001/0029472 A1 | 10/2001 | Hataguchi |
| 2001/0049620 A1 | 12/2001 | Blasko |
| 2001/0051917 A1 | 12/2001 | Bissonette et al. |
| 2001/0054155 A1 | 12/2001 | Hagan et al. |
| 2002/0007323 A1 | 1/2002 | Tamatsu |
| 2002/0016831 A1 | 2/2002 | Peled et al. |
| 2002/0062249 A1 | 5/2002 | Iannacci |
| 2002/0062288 A1 | 5/2002 | Ooishi |
| 2002/0065680 A1 | 5/2002 | Kojima et al. |
| 2002/0065736 A1 | 5/2002 | Willner et al. |
| 2002/0073196 A1 | 6/2002 | Westervelt et al. |
| 2002/0087397 A1 | 7/2002 | Mazza |
| 2002/0087471 A1 | 7/2002 | Ganesan et al. |
| 2002/0099648 A1 | 7/2002 | DeVoe et al. |
| 2002/0107723 A1 | 8/2002 | Benjamin et al. |
| 2002/0111816 A1 | 8/2002 | Lortscher et al. |
| 2002/0111907 A1 | 8/2002 | Ling |
| 2002/0116318 A1 | 8/2002 | Thomas et al. |
| 2002/0120559 A1 | 8/2002 | O'Mara et al. |
| 2002/0133470 A1 | 9/2002 | Gruber |
| 2002/0143611 A1 | 10/2002 | Odinak |
| 2002/0143634 A1 | 10/2002 | Kumar et al. |
| 2002/0153418 A1 | 10/2002 | Maloney |
| 2002/0188508 A1 | 12/2002 | Lee et al. |
| 2003/0005316 A1 | 1/2003 | Girard |
| 2003/0018522 A1 | 1/2003 | Denimarck et al. |
| 2003/0078840 A1 | 4/2003 | Strunk et al. |
| 2003/0097270 A1 | 5/2003 | Musselwhite et al. |
| 2003/0097330 A1 | 5/2003 | Hillmer et al. |
| 2003/0105711 A1 | 6/2003 | O'Neil |
| 2003/0120600 A1 | 6/2003 | Gurevich |
| 2003/0152209 A1 | 8/2003 | Andreason |
| 2003/0154135 A1 | 8/2003 | Covington et al. |
| 2003/0154406 A1* | 8/2003 | Honarvar ............ G06Q 10/10 726/10 |
| 2003/0163413 A1 | 8/2003 | Wiczkowski |
| 2003/0195753 A1 | 10/2003 | Homuth |
| 2003/0200308 A1 | 10/2003 | Tameda et al. |
| 2003/0217148 A1 | 11/2003 | Mullen et al. |
| 2003/0220858 A1 | 11/2003 | Lam et al. |
| 2003/0233580 A1 | 12/2003 | Keeler et al. |
| 2004/0002894 A1 | 1/2004 | Kocher |
| 2004/0010462 A1 | 1/2004 | Moon et al. |
| 2004/0019531 A1 | 1/2004 | Broussard et al. |
| 2004/0044627 A1 | 3/2004 | Russell et al. |
| 2004/0049451 A1 | 3/2004 | Berardi et al. |
| 2004/0059693 A1 | 3/2004 | Hausen et al. |
| 2004/0078260 A1 | 4/2004 | Milgramm et al. |
| 2004/0083165 A1 | 4/2004 | Lawrence |
| 2004/0088238 A1 | 5/2004 | Gilson et al. |
| 2004/0122736 A1 | 6/2004 | Strock et al. |
| 2004/0133440 A1 | 7/2004 | Carolan et al. |
| 2004/0143505 A1 | 7/2004 | Kovach |
| 2004/0143527 A1 | 7/2004 | Benkert et al. |
| 2004/0148350 A1 | 7/2004 | Lacy |
| 2004/0169675 A1 | 9/2004 | Beck et al. |
| 2004/0199768 A1 | 10/2004 | Nail |
| 2004/0210531 A1 | 10/2004 | Barron et al. |
| 2004/0230480 A1 | 11/2004 | Kanayama |
| 2004/0236615 A1 | 11/2004 | Msndy |
| 2004/0243467 A1 | 12/2004 | Ewell et al. |
| 2004/0254829 A1 | 12/2004 | Tripp |
| 2004/0254835 A1 | 12/2004 | Thomas et al. |
| 2005/0021365 A1 | 1/2005 | Nakfoor |
| 2005/0027617 A1 | 2/2005 | Zucker et al. |
| 2005/0027618 A1 | 2/2005 | Zucker et al. |
| 2005/0033659 A1 | 2/2005 | Zucker et al. |
| 2005/0040230 A1 | 2/2005 | Swartz et al. |
| 2005/0080719 A1 | 4/2005 | Sellen et al. |
| 2005/0114218 A1 | 5/2005 | Zucker et al. |
| 2005/0114701 A1 | 5/2005 | Atkins et al. |
| 2005/0120024 A1 | 6/2005 | Tharpe et al. |
| 2005/0144130 A1 | 6/2005 | Staniar et al. |
| 2005/0152340 A1 | 7/2005 | Voit et al. |
| 2005/0177416 A1 | 8/2005 | Linden |
| 2005/0177494 A1 | 8/2005 | Kelly et al. |
| 2005/0182674 A1 | 8/2005 | Yeo |
| 2005/0185847 A1 | 8/2005 | Rowe |
| 2005/0251408 A1 | 11/2005 | Swaminathan et al. |
| 2005/0256956 A1 | 11/2005 | Littlefield et al. |
| 2005/0262026 A1 | 11/2005 | Watkins |
| 2005/0278251 A1 | 12/2005 | Hahn-Carlson |
| 2005/0278630 A1 | 12/2005 | Bracey |
| 2005/0283434 A1 | 12/2005 | Hahn-Carlson |
| 2006/0010074 A1 | 1/2006 | Zeitsiff et al. |
| 2006/0020813 A1 | 1/2006 | Birk et al. |
| 2006/0055512 A1 | 3/2006 | Chew |
| 2006/0084410 A1 | 4/2006 | Sutaria et al. |
| 2006/0131390 A1 | 6/2006 | Kim |
| 2006/0143082 A1 | 6/2006 | Ebert |
| 2006/0157563 A1 | 7/2006 | Marshall |
| 2006/0191995 A1 | 8/2006 | Stewart et al. |
| 2006/0195382 A1 | 8/2006 | Sung |
| 2006/0218058 A1 | 9/2006 | Wojcik et al. |
| 2006/0259360 A1 | 11/2006 | Flinn et al. |
| 2006/0278704 A1 | 12/2006 | Saunders et al. |
| 2007/0015491 A1 | 1/2007 | Smith et al. |
| 2007/0017976 A1 | 1/2007 | Peyret et al. |
| 2007/0078760 A1 | 4/2007 | Conaty et al. |
| 2007/0094374 A1 | 4/2007 | Karia et al. |
| 2007/0106619 A1 | 5/2007 | Holdsworth |
| 2007/0106656 A1 | 5/2007 | Gutta |
| 2007/0118891 A1 | 5/2007 | Buer |
| 2007/0156446 A1 | 7/2007 | Jolly et al. |
| 2007/0162337 A1 | 7/2007 | Hawkins et al. |
| 2007/0174249 A1 | 7/2007 | James |
| 2007/0192218 A1 | 8/2007 | Licardi et al. |
| 2007/0207780 A1 | 9/2007 | McLean |
| 2007/0214141 A1 | 9/2007 | Sittig et al. |
| 2007/0219984 A1 | 9/2007 | Aravamudan et al. |
| 2007/0226003 A1 | 9/2007 | Zapiec et al. |

(56) References Cited

U.S. PATENT DOCUMENTS

| | | | |
|---|---|---|---|
| 2007/0233540 A1* | 10/2007 | Sirota | G06Q 20/40 705/7.25 |
| 2007/0250393 A1 | 10/2007 | Alberth, Jr. et al. | |
| 2007/0252004 A1 | 11/2007 | Shiraki et al. | |
| 2007/0278288 A1 | 12/2007 | Simmons | |
| 2008/0066190 A1 | 3/2008 | Shu et al. | |
| 2008/0077809 A1 | 3/2008 | Hayler et al. | |
| 2008/0082418 A1 | 4/2008 | Fordyce et al. | |
| 2008/0103965 A1 | 5/2008 | Foster | |
| 2008/0103966 A1 | 5/2008 | Foster | |
| 2008/0109298 A1 | 5/2008 | Barton | |
| 2008/0114684 A1 | 5/2008 | Foster | |
| 2008/0114691 A1 | 5/2008 | Foster | |
| 2008/0147482 A1 | 6/2008 | Messing et al. | |
| 2008/0162259 A1 | 7/2008 | Patil et al. | |
| 2008/0183588 A1 | 7/2008 | Agrawal et al. | |
| 2008/0189360 A1 | 8/2008 | Kiley et al. | |
| 2008/0195528 A1 | 8/2008 | Keithley | |
| 2008/0201225 A1 | 8/2008 | Maharajh et al. | |
| 2008/0208680 A1 | 8/2008 | Cho | |
| 2008/0228638 A1 | 9/2008 | Scipioni et al. | |
| 2008/0276179 A1 | 11/2008 | Borenstein et al. | |
| 2008/0282338 A1 | 11/2008 | Beer | |
| 2008/0288354 A1 | 11/2008 | Flinn et al. | |
| 2009/0012851 A1 | 1/2009 | Marc | |
| 2009/0032587 A1 | 2/2009 | Takanashi | |
| 2009/0037949 A1 | 2/2009 | Birch | |
| 2009/0048916 A1 | 2/2009 | Nuzum et al. | |
| 2009/0076966 A1 | 3/2009 | Bishop et al. | |
| 2009/0099961 A1 | 4/2009 | Ogilvy | |
| 2009/0119167 A1 | 5/2009 | Kendall et al. | |
| 2009/0119213 A1 | 5/2009 | Hammad et al. | |
| 2009/0132395 A1 | 5/2009 | Lam et al. | |
| 2009/0144392 A1 | 6/2009 | Wang et al. | |
| 2009/0150218 A1 | 6/2009 | Brunner et al. | |
| 2009/0152343 A1 | 6/2009 | Carter et al. | |
| 2009/0157479 A1 | 6/2009 | Caldwell et al. | |
| 2009/0157513 A1 | 6/2009 | Bonev et al. | |
| 2009/0204600 A1 | 8/2009 | Kalik et al. | |
| 2009/0217056 A1 | 8/2009 | Malpani | |
| 2009/0228362 A1 | 9/2009 | Lapsley et al. | |
| 2009/0254448 A1 | 10/2009 | Giobbi | |
| 2009/0254971 A1 | 10/2009 | Herz et al. | |
| 2009/0300512 A1 | 12/2009 | Ahn | |
| 2009/0327151 A1 | 12/2009 | Carlson et al. | |
| 2010/0017302 A1 | 1/2010 | Scipioni | |
| 2010/0031334 A1 | 2/2010 | Shaikh | |
| 2010/0037046 A1 | 2/2010 | Ferg et al. | |
| 2010/0070885 A1 | 3/2010 | Bromenshenkel et al. | |
| 2010/0076846 A1 | 3/2010 | Pfeiffer et al. | |
| 2010/0125490 A1 | 5/2010 | Kiciman et al. | |
| 2010/0205541 A1 | 8/2010 | Rapaport et al. | |
| 2010/0222046 A1 | 9/2010 | Cumming | |
| 2010/0250687 A1 | 9/2010 | Smith et al. | |
| 2010/0257102 A1 | 10/2010 | Perlman | |
| 2010/0262464 A1 | 10/2010 | Monteforte et al. | |
| 2010/0274650 A1 | 10/2010 | Kantor et al. | |
| 2010/0318429 A1 | 12/2010 | Birch | |
| 2011/0029388 A1 | 2/2011 | Kendall et al. | |
| 2011/0035288 A1 | 2/2011 | Clyne | |
| 2011/0040691 A1 | 2/2011 | Martinez et al. | |
| 2011/0082747 A1 | 4/2011 | Khan et al. | |
| 2011/0082764 A1 | 4/2011 | Flusser et al. | |
| 2011/0161168 A1 | 6/2011 | Dubnicki | |
| 2011/0178855 A1 | 7/2011 | Rane et al. | |
| 2011/0202881 A1 | 8/2011 | Singh et al. | |
| 2011/0225094 A1* | 9/2011 | Hammad | G06Q 20/40 705/75 |
| 2011/0231240 A1 | 9/2011 | Schoen et al. | |
| 2011/0238527 A1 | 9/2011 | Smith-Bauer | |
| 2011/0246764 A1 | 10/2011 | Gamez et al. | |
| 2011/0270618 A1 | 11/2011 | Banerjee et al. | |
| 2011/0276496 A1 | 11/2011 | Neville et al. | |
| 2011/0300926 A1 | 12/2011 | Englman et al. | |
| 2011/0302083 A1 | 12/2011 | Bhinder | |
| 2011/0320250 A1 | 12/2011 | Gemmell et al. | |
| 2012/0086549 A1 | 4/2012 | Barnes, Jr. et al. | |
| 2012/0167124 A1 | 6/2012 | Abdeljaoued | |
| 2012/0197988 A1 | 8/2012 | Leppanen et al. | |
| 2012/0290478 A1 | 11/2012 | Crofts et al. | |
| 2013/0030904 A1 | 1/2013 | Aidasani et al. | |
| 2013/0185210 A1 | 7/2013 | Dodson et al. | |
| 2014/0006175 A1 | 1/2014 | Grigg et al. | |

FOREIGN PATENT DOCUMENTS

| | | |
|---|---|---|
| EP | 0791901 | 8/1997 |
| EP | 0855659 | 7/1998 |
| EP | 1244043 | 9/2002 |
| EP | 1533767 | 5/2005 |
| EP | 1713037 | 10/2006 |
| GB | 2387744 | 10/2003 |
| IE | S1999/0239 | 3/2000 |
| JP | 2003085352 | 3/2003 |
| JP | 2005196704 | 7/2005 |
| WO | 9630864 | 10/1996 |
| WO | 9726612 | 7/1997 |
| WO | 9945498 | 9/1999 |
| WO | 9949424 | 9/1999 |
| WO | 0049586 | 8/2000 |
| WO | 0219211 | 3/2002 |
| WO | 0245029 | 6/2002 |
| WO | 2006076168 | 7/2006 |
| WO | 2006125296 | 11/2006 |
| WO | 2008086531 | 7/2008 |

OTHER PUBLICATIONS

Steven H. Low, et al., "Anonymous Credit Cards," Association of Computing Machinery, 1994, pp. 108-117.

David K. Gifford, et al., "Payment Switches for Open Networks," USENIX Workshop on Electronic Commerce, Jul. 1995, 8 pages.

Bellare, et al., "iKP—A Family of Secure Electronic Payment Protocols," Extended Abstract, http//:www.zurich.ibm.com|reclmology/Security/extemlecommerce/, Apr. 16, 1995, 5 pages.

Udo Flohr, "Electric Money," BYTE Magazine, wwwbvte.com/m:tl9705/sec17/art.btml, Jun. 1996, pp. 74-84.

Mark Carroll, "Internet-Commerce Security," BYTE Magazine, May 1997, 3 pages.

Web Usage Control—Web time usage analytics, workexaminer.com, May 14, 2011, all pages.

Microsoft .NET Passport Technical Overview, Microsoft Corporation, Sep. 2001, all pages.

Chavez, et al: "Kasbah: An Agent Marketplace for Buying and Selling Goods", Proceedings of the First International Conference on the Practical Application of Intelligent Agents and Multi-Agent Technology, Blackpool, GB, Apr. 22-24, 1996, pp. 75-90.

Chaum, "Security without Identification: Card Computers to Make Big Brother Obsolete", Communications of the ACM, vol. 28, No. 10, Oct. 1985, pp. 1030-1044.

Chaum, "Achieving Electronic Privacy", Scientific American, Aug. 1992, pp. 96-101.

Schultz, "Privacy-enhancing technologies", Oct. 1997, retrieved from Internet: http://europa.eu.int/comm/internal_market/en/dataprot/studies/petgenen.pdf, retrieved on Jan. 9, 2003, pp. 1-30.

Van Rossum, et al., "Privacy-Enhancing Technologies: The Path to Anonymity (vol. II)", Aug. 1995, retrieved from Internet: http://www.ipc.on.ca/scripts/index_.asp?action=31&P_ID=11361&N_ID=1&PT_ID=9&U_ID=0, retrieved on Jan. 9, 2003.

Clarke, "Identification, Anonymity and Psuedonymity in Consumer Transactions: A Vital Systems Design and Public Policy Issue", Conference on 'Smart Cards: The Issues', Sydney, Oct. 13, 1996, retrieved from the internet: http://www.anu.edu.au/people/Roger.Clarke/DV/AnonPsPol.html, retrieved on Jan. 9, 2003.

"Buying online," Farm Industry News, Mar. 31, 1999, whole document.

"YourCommand Introduces New Search with Certified Privacy", Business Wire, Oct. 7, 1998, whole document.

(56) References Cited

OTHER PUBLICATIONS

"Internet Start-Up Announces Anonymity for Children", Business Wire, Oct. 7, 1998, whole document.
Steinke, Steve, "What Can E-Money Do for Me?", Network vol. 12, No. 13, whole document.
"Risks of Anonymity," Communications of the ACM, vol. 39, No. 12, p. 162, Dec. 1996.
Hoffman, et al, "Building Consumer Trust Online", Communications of the ACM, vol. 42, No. 2, Apr. 1999, pp. 80-85.
"CommerceNet Partners with @YourCommand to Help Solve Privacy Problems on the Internet", PR Newswire, Dec. 3, 1998, p. 236.
Machrone, Bill, "Again, the Privacy Bugaboo", PC Magazine, Apr. 6, 1999, p. 85.
Connolly, Daniel W., "Proposals for Gathering Consumer Demographics", http://www.w3.org/pub/WWW/Demographics/ Proposals.html, pp. 1-6, Nov. 6, 1995.
Streams Online Media Development, "Streams Readies Release of Breakthrough Internet Media Planning and Assessment", http://streams.com/press .sub.-- release.html, pp. 1-2, Aug. 31, 1995.
Tassone, Dominic , "The Lilypad White Paper", http://www.lilypad.net/paper.html,pp. 1-9 & 1-5 Feb. 1, 1997.
Rik Farrow, "Securing the Web: Fire walls, proxy servers, and data driven attacks", InfoWorld, San Mateo, Jun. 19, 1995, vol. 17 Issue 25, p. 103, downloaded from ProQuest on the Internet on Jun. 20, 2006.
Steve Stecklow, "Cyberspace Clash: Computer Users Battle High-Tech Marketers Over Soul of Internet—Firms Believe There is Room for Ads on Vast Network, But Risk Being 'Flamed'" Wall Street Journal. (Eastern edition) New York, Sep. 16, 1993.
Pattie Maes, "Agents that reduce work and information overload" Association for Computing Machinery. Communications of th ACM. New York, Jul. 1994. vol. 37, Iss. 7; p. 30, 11pgs, downloaded from ProQuest on the Internet on Jun. 20, 2006.
Ravi S Achrol, Phillip Kotler, "Marketing in the network economy," Journal of Marketing. Chicago: 1999. vol. 63 p. 146, downloaded from the Internet on Jul. 18, 2007 from ProQuest Direct, 30 pages.
Cheong, Fah-Chun, "Internet Agents: Spiders, Wanderers, Brokers, and Bots", New Riders Publishing, 1996, pp. ii, iv-xiv, 1, 3-35, 183, 185-226.
U.S. Appl. No. 09/100,671, entitled "Third Party Privacy System", by Zucker, et al., filed Jun. 19, 1998.
Wright, "The Law of Electronic Commerce", Second Edition, Little, Brown and Company, Boston, Massachusetts, Nov. 1996, title page and pp. ET:3-6, ET:29-31, App.1:1-28.
Camp, et al., "Token and notational Money in Electronic Commerce", Carnegie Mellon University, Pittsburgh, Pennsylvania, 17 pages.
Moukherjea, et al., "Visualizing the World-Wide Web with the Navigational View Builder", Computer Networks and ISDN Systems, vol. 27, Issue 6, Apr. 1995, pp. 1075-1087.
Aubrey, "Nomads of the Net", Computer Shopper, vol. 15, No. 12, Dec. 1995, 6 pages.
Low, et al., "Anonymous Credit Cards", Proceedings of the Second ACM Conference on Computer and Communication Security, Fairfax, Virginia, Nov. 2-4, 1994, pp. 1-10.
Hauser et al., "On Shopping Incognito", IBM Zurich Research Laboratory, Ruschlikon, Switzerland, Mar. 20, 1996, pp. 1-10.
Gabber et al., "How to Make Personalized Web Browsing Simple, Secure, and Anonymous", Bell Laboratories, Murray Hill, New Jersey, Apr. 5, 1997, cover page and pp. 1-14.
Gray, "Ph.D. Thesis Proposal: Transportable Agents", May 19, 1995, pp. 1-47.
Adam, et al., "Strategic directions in electronic commerce and digital libraries: Towards a digital agora", ACM Computing Surveys, Baltimore, Maryland, Dec. 1996, vol. 28, Issue 4, 16 pages.
Ray, "Information economics and libraries in the digital age", The Bottom Line, 1996, vol. 9, Issue 2, p. 29, 7 pages.
Wallys W. Conhaim, "The Internet—Linking up to a global network: The big race, part II," Link-up 12. 6 (Nov./Dec. 1995): 3, 4 pages. [Retrieved May 31, 2013].
Microsoft .NET Passport Review Guide, Jan. 2004, Microsoft, all pages.
MSN Privacy Statement, last updated: Aug. 2004, downloaded on Mar. 13, 2012, all pages.
Jim Basney, et al., "The MyProxy online credential repository," Software—Practice and Experience, 2005, John Wiley & Sons, Ltd, 17 pages.
David Del Vecchio, et al., "CredEx: User-Centric Credential Management for Grid and Web Services," Proceedings of the IEEE International Conference on Web Services, 2005, 8 pages.
.NET Passport Authentication, updated: Aug. 22, 2005, Microsoft, downloaded on Mar. 13, 2012, all pages.
Rolf Oppliger, "Microsoft .NET Passport: A Security Analysis," IEEE, Jul. 2003, pp. 29-35.
International Preliminary Report on Patentability in Application No. PCT/US2012/048673 dated Jun. 27, 2013, 20 pages.
International Search Report and Written Opinion in Application No. PCT/US2012/048673 dated Oct. 5, 2012, 8 pages.

* cited by examiner

SYSTEMS AND METHODS FOR GENERATING AND USING A DIGITAL PASS

The present application is a continuation of U.S. application Ser. No. 13/193,282, filed Jul. 28, 2011; the disclosure of which is incorporated by reference herein in its entirety.

BACKGROUND

Field of the Invention

The present disclosure generally relates to a digital pass.

Related Art

Although online (or web-based) purchasing has gained popularity in recent years, certain shortcomings have hampered the growth of the web-based economy from its inception. For example, consumers are currently required to provide a variety of personal information to any merchant from which they wish to purchase a good or service. However, consumers are frequently reluctant to share personal information with unknown or vaguely known merchants. Further, consumers must trust that the merchant's website sufficiently encrypts the required personal information before passing it over the internet to the merchant's payment processing system. Further still, assuming a consumer is willing to accept these risks, the consumer is required (each time the consumer makes a purchase) to enter his personal information. Thus, a consumer's risk of fraud and identity theft increases in proportion to the number of online transactions in which a consumer participates. By some estimates, these factors encourage 25% (Forrester Research) to 75% (shop.org) of consumers to drop out of the purchasing process at the point of checkout.

In addition to these problems, a great wealth of information is lost each day. For instance, the large variety of merchant websites makes it difficult, if not impossible, to aggregate data about which products and services a consumer likes. Indeed, merchants often regard such data as proprietary. Although consumers might benefit from insights based upon their purchasing habits, currently these insights are isolated between merchants.

Several prior art systems have attempted to solve one or more of these problems. For example, Google has developed Google checkout, a tool with which an individual completing a purchase online may trust Google to process a transaction. Google may transfer payment to the appropriate merchant. Similarly, Amazon has developed a 1-click ordering tool that permits an Amazon customer to make purchases online with a single button click. Amazon 1-click ordering is limited to Amazon customers. With respect to the loss of data resulting from disparate merchant systems, certain data aggregators (e.g., RapLeaf) have attempted to target marketing to consumers based upon social networking information associated with each consumer. Likewise, Facebook offers a variety of social plugins (e.g., a login button) which merchant developers may add to their websites, and which consumers having Facebook accounts may use to login from a merchant's website.

Although a variety of solutions or partial solutions have been developed in response to some of the problems described above, consumers are still unable to make purchases online in a relaxed and effortless manner. Further, many merchants are reluctant to hand over data about their customers' purchasing habits and interests to a third party (e.g., Google), as doing so may hamper their ability to target marketing and offer discounts to their loyal customers. Thus, what is needed is a system with which consumers may safely and quickly conduct online transactions and which merchants are encouraged to adopt and support.

SUMMARY

The present disclosure includes a system, method, and article of manufacture for generating a digital pass. The method may comprise retrieving a plurality of identity attributes, and grouping one or more identity attributes in the plurality of identity attributes to generate at least one digital pass. The method may further comprise associating a privacy setting with one or more of the identity attributes in the plurality of identity attributes, grouping one or more static identity attributes and one or more dynamic identity attributes to generate at least one digital pass, linking a first digital pass to a second digital pass based upon a familial relationship, a shared identity attribute, and/or a shared preference.

The method may further comprise transmitting an identity attribute to a second system in order to log a user of the digital pass into the second system. The method may further comprise receiving item information associated with a transaction request, retrieving transaction account information associated with a user of the digital pass, approving, based upon the transaction account information, the transaction request, and transmitting only a shipping address of the user to a merchant. Further still, the method may comprise receiving a location of a user of the digital pass and/or biometric data associated with the user of the digital pass, and transmitting an offer to the user of the digital pass and/or transmitting an identity attribute to a merchant, based upon one of the location and/or biometric data.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

Figure 1:
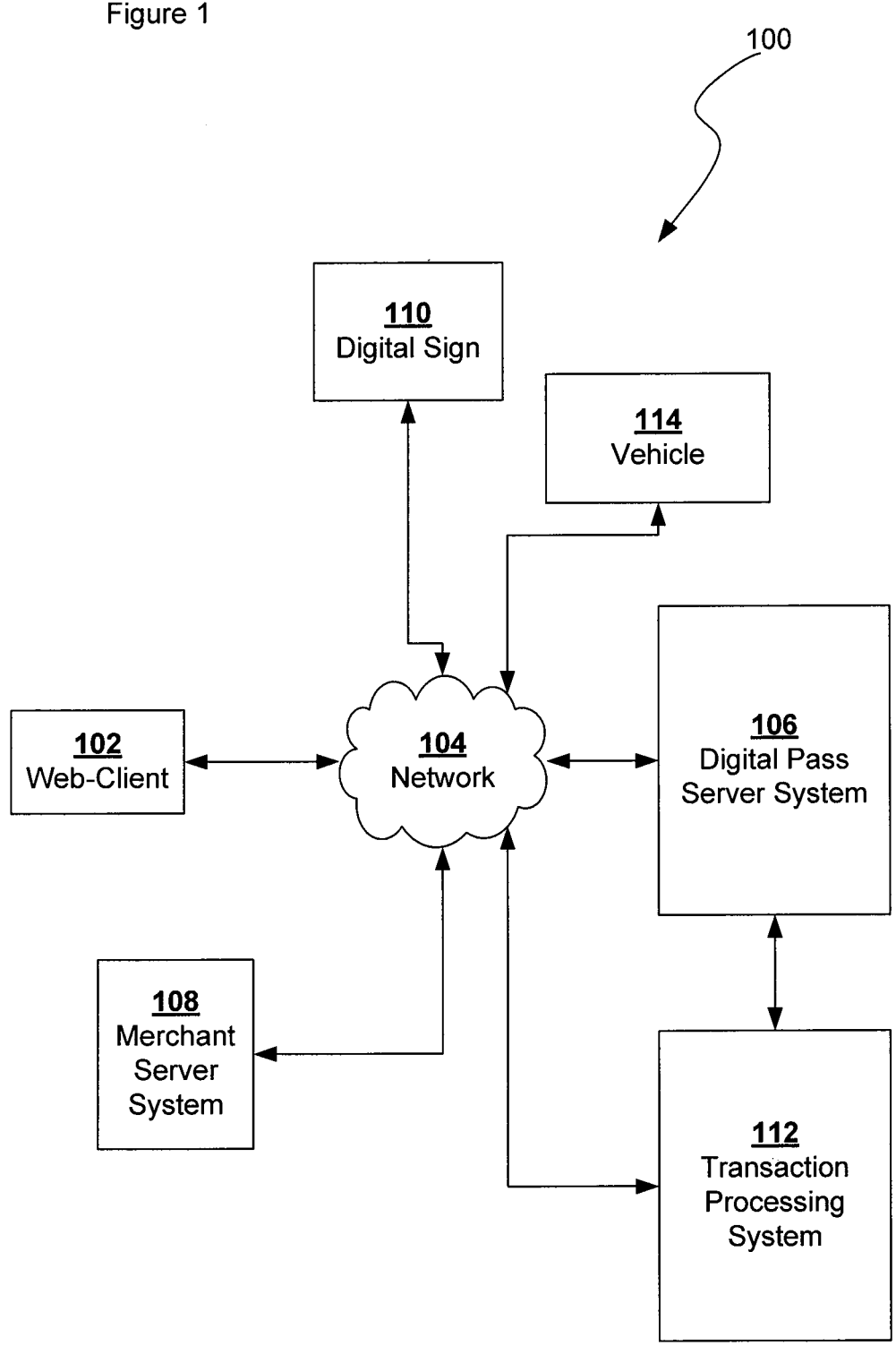
FIG. 1 shows an exemplary system diagram in accordance with an embodiment.

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Phrases and terms similar to "financial institution," "transaction account issuer," and "payment processor" may include any person, entity, software and/or hardware that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business", "merchant", "supplier" or "seller" may be used interchangeably with each other and shall mean any person, entity, distributor system, software and/or hardware that is a provider, broker and/or any other entity in the distribution chain of goods or services and/or that receives payment or other consideration. For example, a merchant may be a grocery store, a retail store, a travel agency, a service provider, an on-line merchant or the like. For example, a supplier may request payment for goods sold to a buyer who holds an account with a transaction account issuer.

The terms "payment vehicle," "financial transaction instrument," "transaction instrument," or "transaction account product" may be used interchangeably throughout to refer to a financial instrument. As used herein, an account code may or may not be associated with a physical financial instrument.

Phrases and terms similar to a "buyer," "participant", "consumer," and "user" may include any person, entity, software and/or hardware that receives items in exchange for consideration (e.g. financial payment). For example, a buyer may purchase, lease, rent, barter or otherwise obtain items from a supplier and pay the supplier using a transaction account.

Phrases and terms similar to an "item" may include any good, service, information, experience, reward, points, coupons, credits, monetary equivalent, anything of value, something of minimal or no value, etc.

As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases or terms similar to a "processor" (such as a payment processor) may include a company (e.g., a third party) appointed (e.g., by a merchant) to handle transactions for merchant banks. Processors may be broken down into two types: front-end and back-end. Front-end processors have connections to various transaction accounts and supply authorization and settlement services to the merchant banks' merchants. Back-end processors accept settlements from front-end processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases or terms similar to a "payment gateway" or "gateway" may include an application service provider that authorizes payments for e-businesses, online retailers, and/or traditional brick and mortar merchants. A payment gateway may protect transaction account details by encrypting sensitive information, such as transaction account numbers, to ensure that information passes securely between the customer and the merchant and also between merchant and payment processor.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases or terms similar to "transaction account" may include any account that may be used to facilitate a financial transaction. A "transaction account" as used herein refers to an account associated with an open account or a closed account system (as described herein). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

An "account", "account code", or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a transponder and RFID reader in RF communication with the transponder (which may include a fob). Typical devices may include, for example, a key ring, tag, card, cell phone, wristwatch or any such form capable of being presented for interrogation.

Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account code may be distributed and stored in any form of plastic, electronic, magnetic, radio frequency, wireless, audio and/or optical device capable of transmitting or downloading data from itself to a second device. A customer account code may be, for example, a sixteen-digit transaction account code, although each transaction account provider has its own numbering system, such as the fifteen-digit numbering system used by American Express. Each company's transaction account codes comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the customer. A merchant account code may be, for example, any number or alpha-numeric characters that identify a particular merchant for purposes of card acceptance, account reconciliation, reporting, or the like.

It should be noted that the transfer of information in accordance with the present disclosure, may be completed in a format recognizable by a merchant system or account issuer. In that regard, by way of example, the information may be transmitted from an RFID device to an RFID reader or from the RFID reader to the merchant system in magnetic stripe or multi-track magnetic stripe format.

In one exemplary embodiment, a system, method and/or computer program product for generating a digital pass is disclosed. As used herein, a digital pass may include all or part of a consumer's personal information. A digital pass may be based upon, derived from and/or include, for example, a consumer's name, address, ethnicity, gender, other background information, spend history, interests, relationships, preferences, hobbies, social networks, mobile device information, transaction account information, and the like. A digital pass may confer a variety of benefits upon a consumer and/or upon a merchant. For example, a digital pass may permit a consumer to make a purchase from a merchant's website securely and without releasing personal information to the merchant over the internet. Likewise, a digital pass may increase a merchant's online sales, as it may encourage consumers to purchase more freely online.

Referring to FIG. 1, an exemplary system 100 for generating and using a digital pass is shown. System 100 may comprise a web-client 102, a network 104, a digital pass server system 106, a merchant server system 108, a digital sign 110, a transaction processing system 112, and/or a vehicle 114.

A web-client 102 may include any device (e.g., personal computer/mobile communication device) which communicates via any network 104. A web-client 104 may be associated with and/or used by a consumer, a merchant, or both. A web-client 102 may comprise a variety of browsing software or browser applications (e.g., Microsoft Internet Explorer, Mozilla Firefox, Google Chrome, Apple Safari, or any other of the myriad software packages available for browsing the internet). Such browser applications may comprise Internet browsing software installed within a computing unit or a system to conduct online transactions and/or communications. These computing units or systems may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Droid®, etc.) set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network 104.

As those skilled in the art will appreciate, a web-client 102 may include an operating system (e.g., Windows NT, 95/98/2000/CE/Mobile, OS2, UNIX, Linux, Solaris, MacOS, PalmOS, etc.) as well as various conventional support software and drivers typically associated with computers. A web-client 102 may implement security protocols such as Secure Sockets Layer (SSL) and Transport Layer Security (TLS). A web-client 102 may implement one or more application layer protocols, including, for example, http, https, ftp, and sftp. Transactions originating at a web client may pass through a firewall (not shown; see below) in order to prevent unauthorized access from users of other networks.

A network 104 may comprise any electronic communications system or method which incorporates software and/or hardware components. Communication may be accomplished through any suitable communication channels, such as, for example, a telephone network, an extranet, an intranet, Internet, point of interaction device (point of sale device, personal digital assistant, smart phone, cellular phone (e.g., iPhone®, Palm Pilot®, Blackberry®), kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although a network 104 may be described herein as being implemented with TCP/IP communications protocols, the network 104 may also be implemented using IPX, Appletalk, IP-6, NetBIOS, OSI, any tunneling protocol (e.g. IPsec, SSH), or any number of existing or future protocols. If the network 104 is in the nature of a public network, such as the Internet, it may be advantageous to presume the network 104 to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components described herein may be independently, separately or collectively coupled to the network 104 via one or more data links including, for example, a connection to an Internet Service Provider (ISP) over a local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network 104 may be implemented variously. For example, network 104 may be implemented as an interactive television (ITV) network. The systems and methods disclosed herein contemplate the use, sale and/or distribution of any goods, services or information over any network having functionality similar to that described above with reference to network 104.

Digital pass server system ("DPS") 106 may comprise any type of hardware and/or software (e.g., a computer server) configured or configurable to generate and maintain a digital pass. Typically, such a server comprises a rack mountable server appliance running a suitable server application (e.g., IIS).

Transaction processing system ("TPS") 112 may comprise any type of hardware and/or software configured or configurable to process a transaction. Typically, a transaction processing system 112 comprises one or more servers, where the one or more servers may receive a transaction request from a merchant or consumer and approve or deny the request based upon the consumer's account balance, available credit, and the like.

A DPS 106 and/or a TPS 112 may comprise, individually or in combination, a "backend" system. A backend system may further comprise one or more web servers (not shown) and/or one or more payment gateways (not shown, described above). A web server may comprise hardware of software configured or configurable to host a website. A backend system may be owned/operated by a transaction account issuer, e.g., American Express.

Merchant server system 108 may comprise any type of hardware and/or software (e.g., a computer server) configured or configurable to receive data associated with a consumer's digital pass. Typically, such a server comprises a rack mountable server appliance running a suitable server application (e.g., IIS).

Vehicle 114 may comprise any hardware and/or software suitably configured to cause movement. Vehicle 114 may be of any make or manufacture, provided it is sufficiently networked—whether at the factory or via retrofit—such that it may communicate (wirelessly) with digital pass server system 106.

Digital sign 110 may comprise any software and/or hardware suitably configured for any type of interactive digital display. Digital sign 110 may be enabled to communicate with digital pass server system 106. For example, digital sign 110 may comprise a digital display or directory similar to those frequently encountered in shopping malls.

Figure 2:
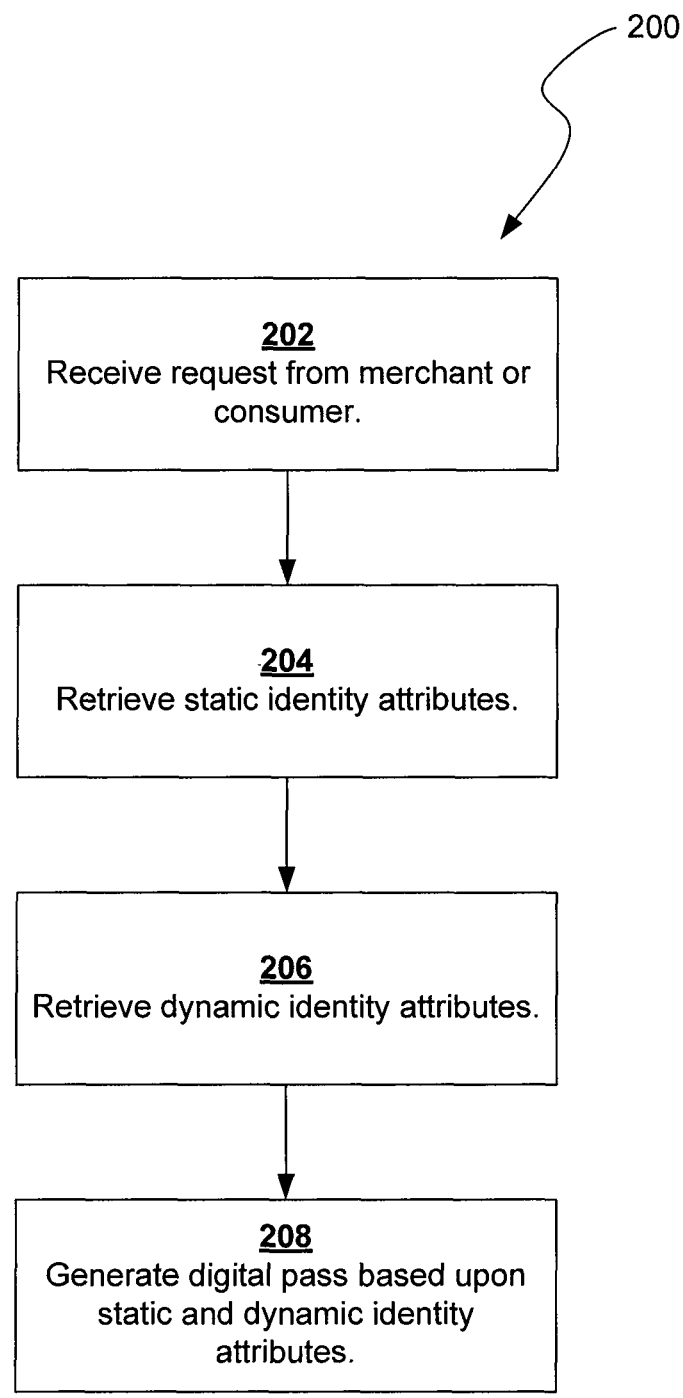
FIG. 2 shows a flowchart depicting an exemplary process for generating a digital pass.

With reference to FIG. 2, an exemplary process 200 for generating/regenerating a digital pass is disclosed. For simplicity, and as used herein, the term generate may apply to both generation and regeneration of a digital pass. Thus, in an embodiment, a backend system may generate a digital pass in response to a request from a merchant and/or a consumer (step 202). A request may comprise a transaction request (i.e., a request to process a transaction/sale of an item), a login request (i.e., a request to login to a customer and/or merchant account), and the like. In an embodiment, a backend system may not receive a request; rather, a backend system may periodically and/or spontaneously generate a digital pass. A backend system may generate a digital pass on a periodic and/or spontaneous basis to capture changes/updates made to a consumer's identity attributes (see below).

A backend system may, in response to receiving a request (and/or periodically/spontaneously), retrieve one or more identity attributes associated with a consumer/digital pass user (step 204). A backend system may retrieve identity attributes from one or more databases or files (not shown). These databases or files may reside on DPS 106 or on a database or fileserver coupled to DPS 106 (not shown). Identity attribute data may be entered by a consumer (i.e., a digital pass user may enter his attribute data so that it is available for generation of his digital pass), and/or the data may be populated from data already known/collected about the consumer (e.g., a purchase history/transaction account code/phone number/etc. associated with the consumer). In this regard, a consumer may enter his attribute data during a digital pass account setup process. For instance, a consumer may visit a digital pass account setup website (not shown), with which the consumer may enter his attribute data. Similarly, a consumer may visit a digital pass account management website (not shown), with which the consumer may update and/or edit his attribute data.

An identity attribute may be static and/or dynamic, and a digital pass may comprise a collection or group of identity attributes. A consumer's static identity attributes may comprise attributes that never change or that rarely change. For example, a consumer's static identity attributes may comprise one or more of the following: a name, a billing address, a phone number, a date of birth, a shipping address, an email address, a gender, an ethnicity, one or more biometrics, educational data, a photograph of the consumer, one or more transaction accounts (e.g., American Express/Visa/Mastercard/bank accounts), information associated with a webclient 102 (e.g., a number or identifier associated with a mobile communication device), and the like. A backend system may further retrieve one or more dynamic identity attributes associated with a consumer (step 206). A consumer's dynamic identity attributes may comprise attributes that change frequently. For example, a consumer's dynamic identity attributes may comprise a spend history, a location, one or more interests, one or more group affiliations, one or more relationships, one or more preferences, one or more hobbies, one or more employers, one or more social networks, and the like.

An attribute may be variously categorized/re-categorized as a static and/or dynamic identity attribute. The categorization or re-categorization may depend upon how often the attribute changes. For example, a consumer's billing address may change on such a frequent basis that it is regarded as a dynamic identity attribute. On the other hand, a consumer's billing address may remain unchanged for such an extended period of time that the attribute is regarded as a static attribute. A variety of inferences may be made based upon the status (i.e., static or dynamic) associated with an attribute. For example, a billing address that changes more than a specified number of times during a specified period (e.g., more than once a year) may give rise to the inference that the consumer is unstable or experiencing financial difficulty. Likewise, a billing address that does not change for many years may give rise to the inference that a consumer is financially stable. The same may be said of a consumer's phone number, shipping address, educational information, location, group affiliations, interests, relationships, employers, and social networks, and the like.

In an embodiment, a consumer may use a digital pass account setup/management website to setup and/or manage a variety of privacy controls. For example, a consumer may specify merchants with which he agrees to do business. If a merchant is not on a consumer's list of approved merchants, TPS 112 may decline to process a request by the merchant. A consumer may further specify which of his identity attributes are private and which attributes, if any, he wishes to expose to the public. A public attribute may be visible to other consumers/digital pass users and/or merchants. For example, a consumer may indicate that his photograph is a public attribute, in which case, other digital pass users/consumers/merchants may gain access to the consumer's photograph. Likewise, a consumer may indicate that his shipping address is a private attribute, in which case the consumer's shipping address will not be shared by the backend system except, of course, to permit shipping of a purchased item to the consumer.

Thus, DPS 106 may generate a digital pass by grouping one or more static and/or dynamic identity attributes associated with a consumer. DPS 106 may generate for a consumer a variety of digital passes. For example, DPS 106 may generate a full digital pass for a consumer. A full digital pass may comprise the entire collection of identity attributes that are available to DPS 106 for a consumer. Likewise, DPS 106 may generate one or more partial or filtered digital passes for a consumer. A partial or filtered digital pass may comprise less than the entire collection of identity attributes available to DPS 106 for a consumer. A partial/filtered digital pass may be generated based upon privacy settings entered by the consumer (see above). A partial/filtered digital pass may also be generated such that it comprises the minimum number of attributes necessary to fulfill a request.

A digital pass may be used for a large variety of purposes, many of which are described below. Each of these may confer a variety of benefits on a digital pass user and/or a merchant with which the user interacts. For example, a digital pass may add a great deal of security to online and offline (i.e., in store) transactions. Moreover, a digital pass may simplify a transaction request process (e.g., a digital pass may eliminate the necessity of filling out an online merchant form). In addition, a digital pass may enable a variety of social networking and/or augmented reality functions. Any of these benefits may be achieved in a way that encourages merchant participation.

A Digital Pass May Link Consumers

Figure 3:
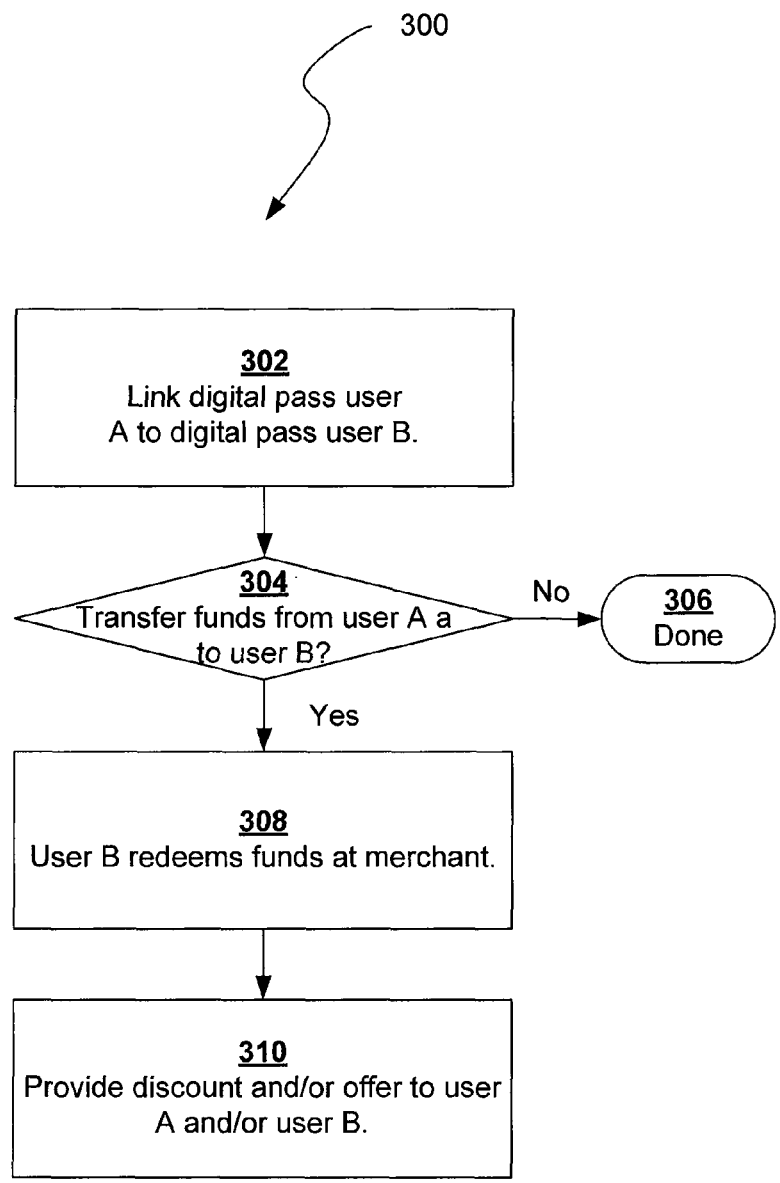
FIG. 3 shows a flowchart depicting an exemplary process for linking digital pass users.

With reference to FIG. 3, a process 300 for linking a digital pass user to another digital pass user is described. A digital pass user ("user A") may be linked to another digital pass user ("user B"). User A may be linked to user B for a variety of reasons. For example, user A may be linked to user B at either user A or user B's request. The non-requesting user may be queried by system 100 as to whether the non-requesting user wishes to accept the requested linkage—i.e., system 100 may inquire (e.g., by sending an electronic message/inquiry/query) into whether the non-requesting user wishes to accept the requesting user's request. If the non-requesting user agrees, the linkage may be established, in which case, DPS 106 may add a link between user A and user B to each of user A's and user B's identity attributes.

In one instance, user B may comprise a beneficiary of user A. A beneficiary may be a child (receiving an allowance), grandparent, gift recipient, and the like. Thus, for example, user A may wish to transfer a certain amount of funds from a transaction account (i.e., an identity attribute) linked to his digital pass to a transaction account linked to the digital pass of user B (step 304). Where user A does not wish to transfer funds to user B, of course, the process 300 may terminate (step 306). Where user A in fact wishes to transfer funds to user B, however, user A may indicate by way of web-client 102 that he wishes to transfer funds in a specific amount, and from a specific transaction account, to user B (step 304). DPS 106 may facilitate the transfer of funds from user A to user B. On receipt of these funds, user B may redeem all or a portion of the funds at a merchant (step 308). For example, where user B is a child of user A, user B may redeem all or a portion of her allowance, which has been transferred into her transaction account (e.g., a prepaid transaction account) by way of her digital pass, with a merchant in the mall, e.g., a Claire's jewelry store (step 308). Claire's may receive payment from user B by way of her digital pass, through which user B may select the transaction account that holds her allowance (see below). Perhaps as an incentive to continue shopping with Claire's, Claire's (or another merchant), may provide a discount and/or an offer to one or both of user A and user B (step 310). For example, a merchant may provide a beneficiary digital pass user a 10% off coupon in response to a purchase processed through a digital pass of the beneficiary user. Likewise, a merchant may provide a donor account holder (e.g., user A) with a 10% off coupon towards a merchant selected by DPS 106 (because user A, who is user B's father, does not like to shop at Claire's). DPS 106 may select a merchant from which to offer user A a coupon or discount based upon all or a portion of user A's identity attributes. For example, DPS 106 may offer user A a coupon at a sporting goods store based upon identity attributes (e.g., hobbies, recent purchases, and the like) indicating or suggesting that user A is a soccer player.

In an embodiment, a merchant may leverage a digital pass user's relationships with other digital pass users and/or attributes that are common to a group of users to target marketing offers and/or discounts to groups of users. For example, a group of digital pass users may share a particular identity attribute (e.g., a hobby or an association like an employer). Similarly, a group of users may be linked, as described above—i.e., two or more users may opt in to a group, such as parent-child, etc. Where either of the foregoing are true, and provided a user's privacy preferences will allow it, DPS 106 may permit a merchant to target offers/discounts to all or a portion of grouped/linked users. A merchant may target offers to the group based upon a variety of criteria. For example, a merchant may target members of a group based upon a recent purchase from the merchant by a member.

A Digital Pass May Comprise a Universal Login

A digital pass may store identity attributes associated with one or more websites requiring login. For example, a digital pass may store identity attributes associated with a user's email addresses/accounts, a user's transaction accounts, a user's accounts with one or more merchants, etc. Thus, a user may login, or be authenticated, to his digital pass account in lieu of logging into, or being authenticated to, one or more other accounts. DPS 106 may thereupon transmit one or more identity attributes (e.g., an account identifier, a login name and password, etc.) to a second system (e.g., a merchant system, an email system, etc.) such that the user is not required to enter this information. A button or other similar option may be provided on a webpage or login page associated with the second system, the selection of which may cause DPS 106 to send the user's login data to the appropriate second system. That is, the button or other option may trigger transmission, by the second system, of a uniform resource locator associated with the second system to DPS 106, which may enable DPS 106 to transmit a user's login information to an appropriate server associated with the second system. The second system may use this information to authenticate the user to the user's account on, or hosted by, the second system. Further, a website or webpage may be personalized or modified based upon a user's digital pass/the public identity attributes associated with his digital pass. More specifically, where a digital pass user is logged into his digital pass account (e.g., through a merchant webpage) the merchant webpage may be customized based upon the digital pass user's identity attributes. Thus, for example, a merchant webpage may be modified to display items in which a digital pass user may hold an interest, such as items of clothing in the digital pass user's correct size and/or items that are associated with a hobby or interest of the digital pass user.

A Digital Pass May Simplify and Safeguard Payment

Figure 4:
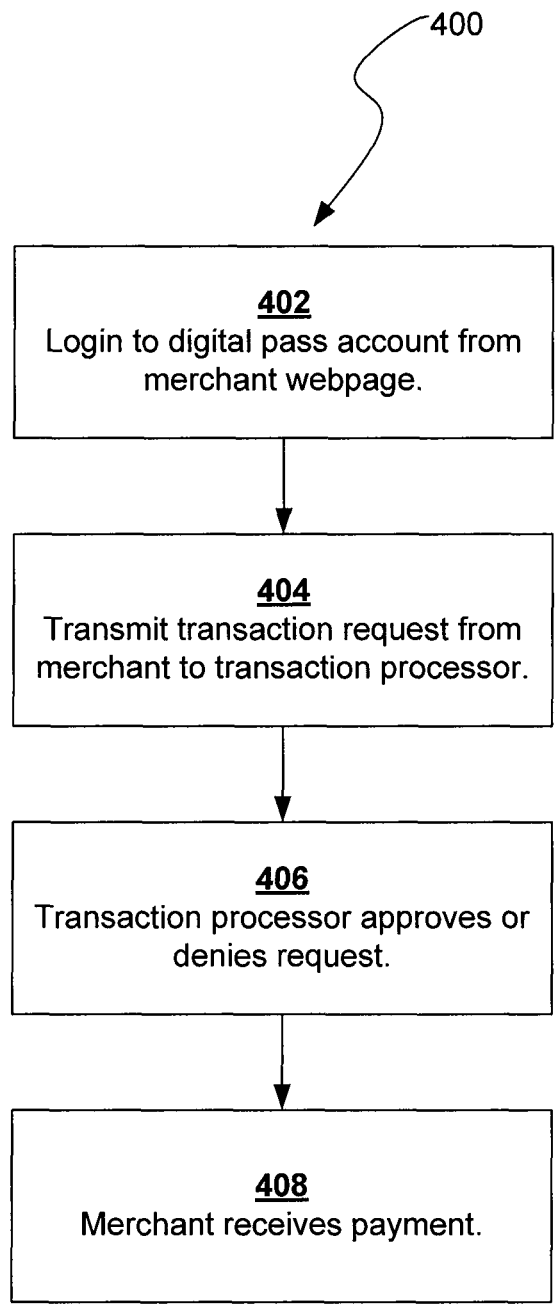
FIG. 4 shows a flowchart depicting an exemplary process for processing a transaction request using a digital pass.

With reference to FIG. 4, a process 400 for making a payment to a merchant is described. In an embodiment, a digital pass user may login to his digital pass account (step 402). The login may include an interface provided on a merchant's website (e.g., a button may be provided that invites the user to login to his digital pass account). In another embodiment, the system may interface with a web browser to store the digital pass. In this regard, instead of the user typing the digital pass login info directly, the digital pass information may be stored in the browser, and the browser may communicate with the website. Instead of using a login form associated with a website, the system may allow a user to log in and log out of websites directly through the browser. The system may also incorporate a new button or menu item in the toolbar that enables the user to pick a login to use at any visited webpage. The system stores logins that the user already established and/or the system may suggest a login that may be applicable to a particular webpage. To increase login security, the system may also generate and/or retain random passwords.

A user may additionally select one or more items from the merchant's website that he wishes to purchase. Having selected one or more items for purchase, a merchant and/consumer may transmit data associated with these items (e.g., a transaction request) to a backend system (step 404). A transaction request may further include a uniform resource locator ("URL") associated with the merchant (e.g., an address for the merchant's webpage). A backend system may process the transaction request based upon the consumer's available credit (step 406); and a backend system may have the ability to look up/retrieve/review/obtain a consumer's available credit by virtue of the fact that the consumer is logged into his digital pass account. U.S. application Ser. No. 13/107,069, filed May 13, 2011, and entitled CLOUD ENABLED PAYMENT PROCESSING SYSTEM AND METHOD, which is hereby incorporated by reference, describes an embodiment of a transaction processing system.

Furthermore, where a consumer has more than one transaction account, the consumer may select, via web-client 102, which transaction account the consumer wishes to use to make the requested purchase. If the consumer has sufficient credit, a backend system may approve the transaction request, in which case, the merchant may receive confirmation and/or payment in the appropriate amount (step 408). On the other hand, if the consumer has insufficient credit, a backend system may deny the transaction request, in which case, the merchant system may not receive confirmation and/or payment (or a communication indicating that a transaction request has not been approved) for the requested items. Confirmation and/or payment and/or a communication to the contrary may be received by way of the URL included in the transaction request. In an embodiment, and where a consumer has greater than a single transaction account, a consumer may select a different transaction account for processing a requested transaction. This may occur, for example, in the event that a first selected transaction account is insufficiently funded for the requested transaction, or where a consumer merely prefers one account to another.

Where a transaction request is approved, a consumer's shipping information may be transmitted to a merchant/merchant system. Thus, system 100 may eliminate the requirement that a consumer provide a variety of personal information to a merchant, including his transaction account information and shipping and billing addresses. Rather, system 100 may shield a consumer's personal information such that the consumer is confident in making purchases online. The consumer may also be saved the trouble of entering his personal information (e.g., his shipping address), as DPS 106 may supply this data to a merchant/merchant system automatically on approval of a transaction request.

A digital pass user may further review an organized list/partial list/group of his purchase receipts by way of his digital pass account. Conveniently, a digital pass user is not limited to reviewing receipts associated with a particular merchant, although a user's receipts may be grouped or organized by DPS 106 by merchant. Thus, for example, a digital pass user may login to his digital pass account to review his receipts for the day, week, month, year, merchant, etc. DPS 106 therefore provides a digital pass user the added advantage of consolidated receipt management.

A merchant may likewise benefit from interacting with consumers who have digital passes. For example, a merchant may be provided with access to a merchant interface (not shown), which the merchant may access by way of a web-client 102. A merchant interface may comprise a variety of software (e.g., a website or web-based system). A merchant interface may provide a merchant with access to a variety of information. For example, a merchant interface may provide a merchant with access to (and organize) information about the types of consumers who shop at their stores, the types of items each consumer purchases, the types of items groups or social networks of consumers purchase, and the like. In brief, a merchant report may provide a variety of insights to a merchant based upon one or more identity attributes and/or preferences associated with the digital pass users who have shopped with the merchant. A merchant may further configure a merchant interface to display one or more reports based upon the data in which the merchant is interested.

A Digital Pass May Illustrate Preferences and Trends

A digital pass may be associated with one or more preferences of a digital pass user. A preference may comprise an inference or conclusion based upon one or more identity attributes and/or one or more other preferences. Thus, for example, a digital pass user's purchase history may show that the digital pass user shops at a particular merchant or purchases a particular item or type of item on a regular or semi-regular basis. Likewise, a digital pass user's identity attributes may contain information related to a hobby, or an association with a team or league. This information, in turn, may suggest that a user is interested in certain merchants, items, types of items, activities, etc. Thus, DPS 106 may analyze a digital pass user's identity attributes in order to generate one or more preferences and/or one or more possible or likely preferences of the user. A user's preferences may comprise a large variety of information. For example, DPS 106 may determine that a user has a preference for sports or a certain sport, or that a user likes food and music based upon an attribute indicating one or more purchases at a sporting goods store and/or a restaurant or record store. Thus, in general, DPS 106 may assign a variety of preferences to a user based upon the user's identity attributes.

Figure 5:
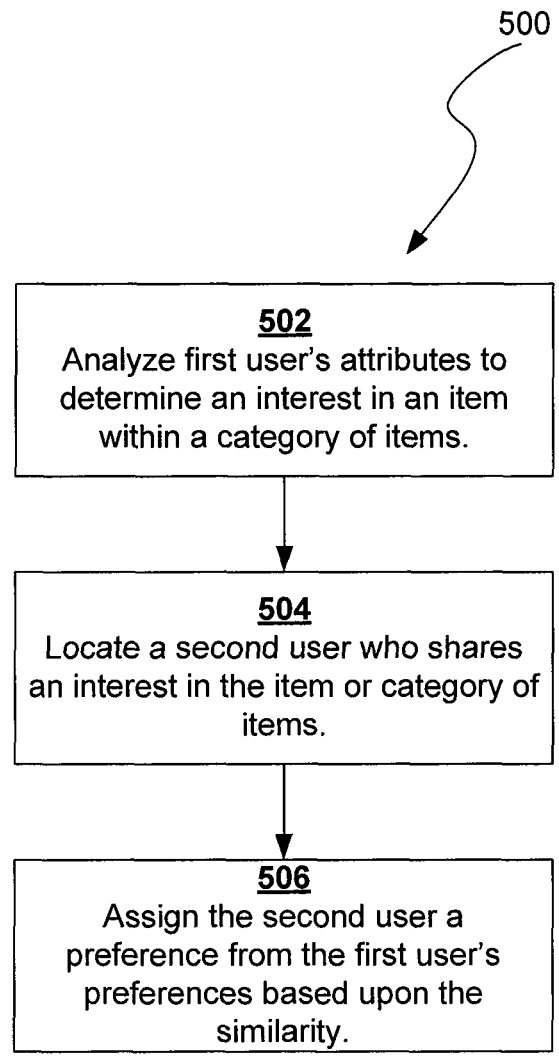
FIG. 5 shows a flowchart depicting an exemplary process for assigning a preference to a digital pass user based upon a relationships identity attribute.

With reference to FIG. 5, a process 500 whereby DPS 106 may further assign a preference to a digital pass user based upon a user's relationships attribute is shown. That is, DPS 106 may assign a preference to a digital pass user based upon a user's linked relationships (see above) and/or a user's shared attribute or attributes with one or more other users (see above). For example, DPS 106 may analyze a first user's identity attributes, at which point DPS 106 may determine that the first user is interested in one or more items in a category or class of items (step 502). For example, DPS 106 may determine that the first user is interested in the category of music, and within that category, DPS 106 may determine that the first user is specifically interested in the following artists: Bob Dylan, Keane, and Dr. Dre. DPS 106 may search a database of (similar) digital pass users for users having one or more interests in common with the first user, or a second/similar user may make a purchase or update his digital pass attributes to reflect an interest in one or more of the foregoing artists and/or categories. In response to one or more of these actions, DPS 106 may determine/infer that the similar user may have some interest in one or more of the other artists in which the first user is interested (step 504). Similarly, DPS 106 may determine/infer that the similar user is interested in a category of music (e.g., folk, rock, hip hop) based upon the similar user's resemblance to the first user (step 506). DPS 106 may therefore assign the similar user a preference (e.g., an interest in folk, rock, hip hop, or one of the above mentioned artists) based upon the discovered similarity (step 506). DPS 106 may further target marketing (e.g., offers and discounts) to one or more of the users based upon these inferences.

In some instances, DPS 106 may determine that a similar user is interested in an item or category in which only a first user is apparently interested (i.e., DPS 106 may make a seemingly invalid inference). With regard to the foregoing example, DPS 106 may infer that the similar user, like the first user, may find Dr. Dre appealing, although the similar user's identity attributes would otherwise recommend against such a conclusion (e.g., the similar user's identity attributes show an interest in rock music only). However, based upon a similarity between the first user and the similar user, DPS 106 may nevertheless assign a tentative preference (or target marketing) to the similar user indicating a potential interest in the unlikely item/category. For example, with reference to the foregoing example, DPS 106 may assign a tentative preference for Dr. Dre and/or hip hop music (the genre to which Dr. Dre's must most likely belongs) to the similar user, despite the similar user's apparent interest only in rock music. (step 506). Thus, DPS 106 may assign a preference to a similar digital pass user when the interest is categorized in a category of preferences already associated with the similar digital pass user. In contrast, DPS 106 may assign a preference to a similar digital pass user which is not categorized in a category of preferences already associated with the similar digital pass user.

A Digital Pass May Facilitate and Enhance a User's Interaction with the Physical World In an embodiment, a merchant may access a digital pass user's (public) identity attributes and/or preferences in order to recommend items to the user. For example, a user may log into his digital pass account (see above) from a merchant website. DPS 106 may make certain information about the user available to the merchant website. For instance, DPS 106 may transmit a gender, a clothing size, and/or preference to the merchant website. The merchant website may use the information provided by DPS 106 about the user to filter the items displayed for the user by the website such that the user is only presented with items suited to the user. For example, where the merchant website sells clothing, the merchant website may filter the clothing displayed for sale to the user to that which is currently available in the user's size.

In an embodiment, a user's digital pass may comprise an identity attribute associated with a mobile communication device (i.e., a web-client 102) of the user. Where the user's mobile communication device 102 comprises a GPS enabled device (or where the location of the device is otherwise available), DPS 106 may provide a merchant with a user's location, again, assuming that the user's location attribute is set to public in the user's privacy settings.

A digital pass may be associated with biometric information (see above) about a consumer. For example, a digital pass may comprise an image or representation of a consumer's retina and/or a consumer's facial features. In response to detecting and/or capturing an image of a consumer's biometric information (e.g., perhaps by way of a camera and/or other imaging device mounted in a merchant location), a merchant may present one or more offers and/or discounts to a consumer and/or direct a retail attendant to show the user certain items (e.g., clothing in a certain size). For example, a consumer, walking in to a merchant location and/or a mall, may be presented with an offer for 10% off of a purchase from the merchant. Likewise, a merchant may present an offer and/or discount for an item in which the consumer may have some interest (e.g., an item of clothing in the consumer's size and/or based upon the consumer's gender, preferences, etc.). As described above, a merchant may make such an offer based upon one or more attributes and/or preferences associated with a consumer's digital pass. An offer may be displayed for a consumer by way of any hardware and/or software configured or configurable to display an image or otherwise announce the offer. For example, digital sign 110 may display an offer/discount.

A merchant may further direct a digital pass user to one or more items based upon the user's location. Thus, for example, a digital pass user may upload or generate a grocery or shopping list prior to entering a merchant location (e.g., a grocery store). As the user travels up and down the aisles of the store, the user's mobile communication device (an identity attribute) may be configured to guide the user to the location of the next item on the user's list, or the next closest item on the user's list.

In an embodiment, a digital pass may play a part in an augmented reality system (not shown). For example, a digital pass user, while shopping, driving, walking, etc., may wear augmented reality goggles/spectacles, which may communicate with an augmented reality system to highlight and/or display information about a variety of objects and/or items in the digital pass user's field of vision of physical vicinity. A digital pass user's mobile communication device/web-client 102 may perform the same function. Thus, a digital pass user may enter a merchant location, whereupon he may be presented (through his augmented reality goggles/spectacles/mobile communication device) with information about sales items, items in his size, items in which the merchant believes the user will have some interest (again, based fully or partly on the user's identity attributes and/or preferences), etc. A user may further be presented with a digital or virtual wardrobe based upon a merchant's inventory, the user's identity attributes, and/or the user's preferences.

A digital pass may facilitate and simplify a digital pass user's interaction with a public transit system. For example, a digital pass user may enter a public transportation system (e.g., the Metro which criss-crosses the Washington D.C. metro area) without swiping a bus pass (e.g., a SmartCard) or entering another form of payment. Rather, because the digital pass user's biometric information comprises an identity attribute, an image of the user may be captured as the user enters the public transportation system. Likewise, an image of the user may be captured as the user exits the public transportation system. The public transportation system may therefore accurately compute a fare for the user, which the system may forward or submit to a DPS 106 and/or a TPS 112, which system(s) may supply payment. Thus, a digital pass user's public transportation experience may be greatly simplified.

Figure 6:
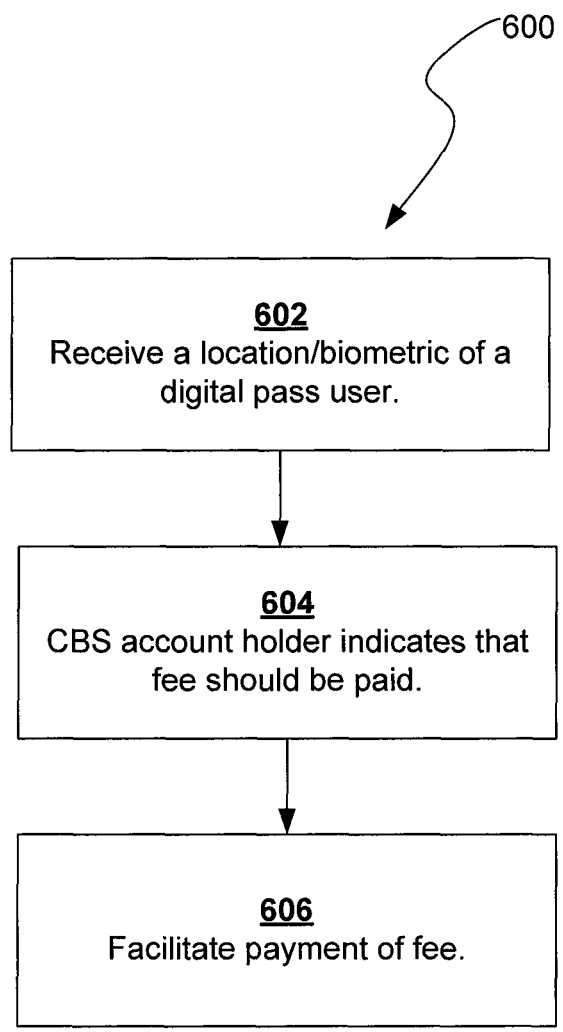
FIG. 6 shows a flowchart depicting an exemplary process for paying a fee based upon a digital pass and a location and/or biometric associated with a user of the digital pass.

With reference now to FIG. 6, a digital pass may also facilitate and simplify a digital pass user's interaction with a fee station in a parking garage, on a turnpike, and the like. Initially, a backend system may receive a location and/or a biometric associated with a digital pass user (step 602). Where a backend system receives a location of a user, the backend system may generate a query for the user asking whether he wishes to pay in advance for an upcoming toll or fee (step 604). If the user confirms his desire to effectuate payment prior to his arrival (or upon his arrival) at the fee station, a backend system may arrange for payment as described more generally above (step 606). Where, on the other hand, a backend system receives a biometric associated with a user (which, incidentally, an image capture system associated with a fee station may record), the user's web-client 102 (e.g., his mobile communication device) may present a payment option. Here as well, if the user confirms his desire to effectuate payment, the user's may do so prior to or upon his arrival at the fee station (depending upon the location of the biometric capture device) (step 606).

A Digital Pass May be Useful in the Workplace

In an embodiment, an employee (e.g., a corporate employee) may simplify or aggregate a variety of work related tasks using his digital pass. For example, an employee may log in to and/or access one or more of his employer's systems (e.g., his employer's mail server) using his digital pass. This might be accomplished by way of an identity attribute in the employee's digital pass that saves the employee's username and/or login information for the employer's system(s). An employee may further log-in via any of his employer's workstations, which may be provided on a variety of campuses or scattered across a variety of locations. Thus, an employee may log in irrespective of his location. Furthermore, a digital pass may make an employee's location available to one or more other employees. Thus, irrespective of the workstation selected by an employee, other employees may easily locate the employee by virtue of the fact that the employee is logged into the (uniquely located) workstation. Further still, a digital pass may record an employee's login time and logout time, which information an employer may use for a variety of purposes (e.g., to record access data, to fill out a time slip, etc.) Having logged into his employer's system(s), an employee may be furnished with his daily calendar and/or the software and/or data to which he may require access during the day, based upon his calendared activities.

An employee may further utilize his digital pass to make purchases on a corporate account. For example, an employee's corporate transaction account (issued through his employer) may be linked to the employee's digital pass; that is, an employee's corporate transaction account may comprise an identity attribute, in the same way that his one or more personal transaction accounts may comprise identity attributes. However, where the employee is engaged in business on behalf of his employer (e.g., he is purchasing lunch for a client, he is making travel reservations to travel to a field office, etc.), the employee may select, instead of a personal transaction account, his corporate transaction account. This may be accomplished through the use of a web-client 102, such as the employee's mobile communication device. Having selected his corporate transaction account, a backend system may process payment through this account. At this point, an employer, like a merchant (see above) may have access to an employer interface (as opposed to a merchant interface, but similar in purpose), through which the employer may generate a variety of reports. For instance, an employer may review an employee's time at work for a particular time period (day, week, month, year, etc.), an employee's spending history, and the like.

In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in certain embodiments.

In various embodiments, the methods described herein are implemented using the various particular machines described herein. The methods described herein may be implemented using the particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, 95/98/2000, XP, Vista, OS2, UNIX, Linux, Solaris, MacOS, etc.) as well as various conventional support software and drivers typically associated with computers. A user may include any individual, business, entity, government organization, software and/or hardware that interact with a system.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

A firewall may comprise any hardware and/or software suitably configured to protect system 100 components and/or enterprise computing resources from users of other networks. Further, a firewall may be configured to limit or restrict access to various systems and components behind the firewall for web clients 102 connecting through a web server. A firewall may reside in varying configurations including Stateful Inspection, Proxy based, access control lists, and Packet Filtering among others. A firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

Encryption may be performed by way of any of the techniques now available in the art or which may become available—e.g., Twofish, RSA, El Gamal, Schorr signature, DSA, PGP, PKI, and symmetric and asymmetric cryptosystems.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the inventions have been described as a method in certain embodiments, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   a computer system storing digital pass information for a user that includes:
      authentication information for logging the user into a plurality of merchant systems;
      preference information indicating items and activities of interest to the user;
      financial information that includes one or more transaction accounts; and
      address information for the user;
   subsequent to the user accessing a website of a particular one of the plurality of merchant systems, the computer system presenting, to the user, a suggested set of the authentication information usable to log the user into an account hosted by the particular merchant system, wherein the suggested set includes a username and a password associated with the account;
   receiving, by the computer system, a request to log the user into the account hosted by the particular merchant system, wherein the request includes a selection, by the user, of the suggested set of the authentication information;
   accessing, by the computer system, the suggested set of the authentication information within the digital pass information for the user;
   accessing, by the computer system, a set of the preference information for the user;
   sending, by the computer system to the particular merchant system, the suggested set of the authentication information and the set of the preference information, wherein the particular merchant system is configured to utilize the set of the preference information to select customized content for the user and present, to the user, a customized webpage of the web site that includes the customized content;
   receiving, by the computer system, transaction information indicating that a transaction has been initiated by the user via the customized webpage, wherein the transaction is for an item indicated by the customized content;
   receiving, by the computer system, a selection of a particular transaction account of the one or more transaction accounts indicated in the digital pass information for the user;
   based on an amount of payment included in the transaction information, the computer system determining that an amount of available credit indicated by the particular transaction account corresponding to the user exceeds or is equal to the amount of payment; and
   in response to authorizing the transaction, the computer system:
      causing a transfer of payment for the transaction from the particular transaction account of the user to a financial account associated with the particular merchant system; and
      providing the address information to the particular merchant system for delivering the item to the user.

2. The method of claim 1, wherein the digital pass information includes personal information of the user previously entered by the user.

3. The method of claim 1, wherein the computer system causes the transfer without transmitting the financial information of the user to the particular merchant system.

4. The method of claim 1, further comprising:
determining, by the computer system, that at least one attribute of a plurality of attributes of the user stored in the digital pass information is identical to an attribute of a second user; and
based on the at least one attribute, the computer system transmitting to the user and the second user a purchase incentive for the particular merchant system.

5. The method of claim 1, wherein the address information includes a static attribute that has remained unchanged over a period of time and the preference information includes a dynamic attribute that has changed over the period of time, and the method further comprising:
in response to the static attribute changing, the computer system determining one or more inferences about the user.

6. A computer system comprising:
at least one processor; and
a non-transitory memory configured to communicate with the processor, the non-transitory memory having instructions stored thereon that are executable by the at least one processor to cause the computer system to perform operations comprising:
storing digital pass information for a user that includes:
authentication information for logging the user into a plurality of seller systems;
preference information indicating items and activities of interest to the user;
financial information that includes one or more transaction accounts; and
address information for the user;
subsequent to the user accessing a website of a particular one of the plurality of seller systems, presenting, to the user, a suggested set of the authentication information usable to log the user into an account hosted by the particular seller system, wherein the suggested set includes a username and a password associated with the account;
receiving a request to log the user into the account hosted by the particular seller system, wherein the request includes a selection, by the user, of the suggested set of the authentication information;
accessing the suggested set of the authentication information within the digital pass information for the user;
accessing a set of the preference information for the user;
sending, to the seller system, the suggested set of the authentication information and the set of the preference information, wherein the particular seller system is configured to utilize the set of the preference information to select customized content for the user and present, to the user, a customized webpage of the web site that includes the customized content;
receiving purchase information indicating that the user has initiated a purchase from the particular seller system via the customized webpage, wherein the purchase is for an item indicated by the customized webpage;
receiving a selection of a particular transaction account of the one or more transaction accounts indicated in the digital pass information for the user;
based on an amount of payment included in the purchase information, determining that an amount of available credit indicated by the particular transaction account of the user exceeds or is equal to the amount of payment for the purchase;
transferring a payment for the purchase from the particular transaction account of the user to a financial account associated with the particular seller system; and
providing the address information to the particular seller system for delivering the item to the user.

7. The computer system of claim 6, wherein the operations further comprise:
based on privacy information associated with the user, wherein the privacy information indicates attributes of the digital pass information that the particular seller system can access, transmitting to the user a discount for the purchase.

8. The computer system of claim 6, wherein the operations further comprise:
based on privacy information associated with the user, wherein the privacy information indicates that a particular portion of the digital pass information is publicly accessible, allowing other users to access the particular portion.

9. The computer system of claim 6, wherein the operations further comprise:
prior to receiving the purchase information, receiving a location of the user; and
based on the location, transmitting to the user an offer for the purchase.

10. An article of manufacture including a non-transitory computer readable medium having instructions stored thereon that are executable to cause a computer system to perform operations comprising:
storing digital pass information for a user that includes:
authentication information for logging the user into a plurality of seller systems;
preference information indicating items and activities of interest to the user;
financial information that includes one or more transaction accounts; and
address information for the user;
subsequent to the user accessing a website of a particular one of the plurality of seller systems, presenting, to the user, a suggested set of the authentication information usable to log the user into an account hosted by the particular seller system, wherein the suggested set includes a username and a password associated with the account;
receiving a request to log the user into the account hosted by the particular seller system, wherein the request includes a selection, by the user, of the suggested set of the authentication information;
accessing the suggested set of the authentication information within the digital pass information for the user;
accessing a set of the preference information for the user;
sending, to the particular seller system, the suggested set of the authentication information and the set of the preference information, wherein the particular seller system is configured to utilize the set of the preference information to select customized content for the user and present, to the user, a customized webpage of the web site that includes the customized content;
receiving, from the particular seller system, a second request for a payment corresponding to a transaction between a seller and the user, wherein the transaction has been initiated via the customized webpage, wherein the transaction is for an item indicated by the customized content;
receiving a selection of a particular transaction account of the one or more transaction accounts indicated in the digital pass information for the user;
based on an amount of the payment included in the second request, determining that an amount of available credit indicated by the particular transaction account corresponding to the user exceeds or is equal to the amount of the payment;

in response to authorizing the transaction, transferring payment from the particular transaction account of the user to a financial account associated with the particular seller system; and providing the address information to the particular seller system for delivering the item to the user.

11. The article of manufacture of claim 10, wherein the operations further comprise:

based on privacy preference information stored for the user indicating that a portion of the digital pass information of the user is publicly accessible, allowing other users to access the portion of the digital pass information.

12. The article of manufacture of claim 10, wherein the operations further comprise:

based on privacy preference information stored for the user indicating that a location associated with the user is publicly accessible, transmitting to the user a purchase incentive specific to the location.

\* \* \* \* \*